(12) United States Patent
Oikarinen et al.

(10) Patent No.: US 12,429,648 B2
(45) Date of Patent: Sep. 30, 2025

(54) LIGHT GUIDE ASSEMBLY FOR A VEHICLE

(71) Applicant: Volvo Car Corporation, Gothenburg (SE)

(72) Inventors: Jari Oikarinen, Gothenburg (SE); Daniel Alejandro Torres Espinosa, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/544,965

(22) Filed: Dec. 19, 2023

(65) Prior Publication Data

US 2025/0199233 A1    Jun. 19, 2025

(51) Int. Cl.
*F21V 8/00* (2006.01)
*B60Q 1/30* (2006.01)
*B60Q 3/62* (2017.01)

(52) U.S. Cl.
CPC ............. *G02B 6/0068* (2013.01); *B60Q 3/62* (2017.02); *G02B 6/0076* (2013.01); *B60Q 1/30* (2013.01)

(58) Field of Classification Search
CPC .. G02B 6/0031; G02B 6/0078; G02B 6/0018; B60Q 3/745; B60Q 3/00; F21Y 2105/00; F21V 2200/20; F21S 43/235
See application file for complete search history.

(56) References Cited

U.S. PATENT DOCUMENTS

| | | | | |
|---|---|---|---|---|
| 2010/0039832 A1* | 2/2010 | Ahlgren | ............... | G02B 6/0068 |
| | | | | 362/613 |
| 2010/0315833 A1* | 12/2010 | Holman | ..................... | F21K 9/23 |
| | | | | 362/606 |
| 2014/0049983 A1* | 2/2014 | Nichol | ................. | G02B 6/0028 |
| | | | | 362/610 |
| 2018/0283652 A1* | 10/2018 | Lee | .......................... | F21S 43/14 |

* cited by examiner

*Primary Examiner* — William J Carter
(74) *Attorney, Agent, or Firm* — Clements Bernard Walker; Christopher L. Bernard

(57) ABSTRACT

A light guide assembly, including: a light guide; a first light source optically coupled to the light guide; and a second light source optically coupled to the light guide; where the light guide includes a first section adapted to extract light from the first light source, but not the second light source, thereby illuminating the first section; and where the light guide includes a second section adapted to extract light from the second light source, but not the first light source, thereby illuminating the second section. The first section is adapted to directionally extract light from only the first light source. The second section is adapted to directionally extract light from only the second light source. Each of the first section and the second section is manufactured with a bulk optical property or geometrical features to selectively extract light from only the first light source or the second light source.

20 Claims, 7 Drawing Sheets

LIGHT GUIDE ASSEMBLY FOR A VEHICLE

TECHNICAL FIELD

The present disclosure relates generally to the automotive and lighting fields. More particularly, the present disclosure relates to a light guide assembly for a vehicle, such as that used for interior and exterior lighting systems.

BACKGROUND ART

Light guides are a common component in optical systems, such as those used for interior and exterior lighting systems in vehicles. These light guides, which are typically illuminated with one or more light-emitting diodes (LEDs), generally benefit from low power consumption and cost. However, the light guides provide limited animation functionality due to the on/off nature of the LEDs and the illuminated/not illuminated nature of the light guides. At best, fade in/out animation is possible if the LEDs are faded in/out. This means that desirable functionalities such as sequential turn indicators and the like are not possible.

This background is provided as illustrative environmental context only and should not be construed to be limiting in any manner. It will be readily apparent to those of ordinary skill in the art that the concepts and principles of the present disclosure may be implemented in other environmental contexts equally, such as in non-vehicle applications.

SUMMARY

The present disclosure provides a light guide assembly that includes a light guide and a LED disposed at either end of the light guide, for example. The light guide includes two sections, one section that has an optical geometry or properties such that it is illuminated by activation of one of the LEDs and another section that has an optical geometry or properties such that it is illuminated by activation of the other of the LEDs. In this manner, selective activation of the LEDs provides selective illumination of the different section of the light guide. This concept may be extended beyond two sections and two LEDs, providing the light guide assembly with multiple addressable "pixels," as light guides and LEDs may be stacked or disposed in adjacency to provide cumulative illumination effects. In this manner, more complex animations can be provided by the light guide assembly as compared to conventional light guides with simple on/off or fade in/out LEDs.

In one embodiment, the present disclosure provides a light guide assembly, including: a light guide; a first light source optically coupled to the light guide; and a second light source optically coupled to the light guide; where the light guide includes a first section adapted to extract light from the first light source, but not the second light source, thereby illuminating the first section; and where the light guide includes a second section adapted to extract light from the second light source, but not the first light source, thereby illuminating the second section. The first light source includes a first light emitting diode optically coupled to a first end of the light guide. The second light source includes a second light emitting diode optically coupled to a second end of the light guide. The first section is adapted to directionally extract light from the first light source, but not the second light source. The second section is adapted to directionally extract light from the second light source, but not the first light source. Each of the first section and the second section is manufactured with a bulk optical property or geometrical features to selectively extract light from only the first light source or the second light source. By way of example only, the light guide assembly is utilized in one of an interior lighting system and an exterior lighting system of a vehicle providing a degree of lighting animation.

In another embodiment, the present disclosure provides a multi-light guide assembly, including: a plurality of light guides disposed in parallel; a first light source optically coupled to each of the plurality of light guides; and a second light source optically coupled to each of the plurality of light guides; where each of the plurality of light guides includes a first section adapted to extract light from the first light source, but not the second light source, thereby illuminating the first section; and where each of the plurality of light guides includes a second section adapted to extract light from the second light source, but not the first light source, thereby illuminating the second section. The first light source includes a first light emitting diode optically coupled to a first end of the corresponding light guide. The second light source includes a second light emitting diode optically coupled to a second end of the corresponding light guide. The first section is adapted to directionally extract light from the first light source, but not the second light source. The second section is adapted to directionally extract light from the second light source, but not the first light source. Each of the first section and the second section is manufactured with a bulk optical property or geometrical features to selectively extract light from only the first light source or the second light source. By way of example only, the multi-light guide assembly is utilized in one of an interior lighting system and an exterior lighting system of a vehicle providing a degree of lighting animation.

In a further embodiment, the present disclosure provides a lighting method, including: providing a light guide assembly, including: a light guide; a first light source optically coupled to the light guide; and a second light source optically coupled to the light guide; where the light guide includes a first section adapted to extract light from the first light source, but not the second light source, thereby illuminating the first section; and where the light guide includes a second section adapted to extract light from the second light source, but not the first light source, thereby illuminating the second section; and selectively actuating one or more of the first light source and the second light source to selectively illuminate one or more of the first section and the second section. The first light source includes a first light emitting diode optically coupled to a first end of the light guide. The second light source includes a second light emitting diode optically coupled to a second end of the light guide. The first section is adapted to directionally extract light from the first light source, but not the second light source. The second section is adapted to directionally extract light from the second light source, but not the first light source. Each of the first section and the second section is manufactured with a bulk optical property or geometrical features to selectively extract light from only the first light source or the second light source.

It will be readily apparent to those of ordinary skill in the art that aspects and features of the various described embodiments of the present disclosure may be utilized, omitted, and/or combined as desired in a given application, without limitation.

BRIEF DESCRIPTION OF THE DRAWINGS

The present disclosure is illustrated and described with reference to the various drawings, in which like reference numbers are used to denote like assembly components/method steps, as appropriate, and in which.

Again, it will be readily apparent to those of ordinary skill in the art that aspects and features of the various illustrated embodiments of the present disclosure may be utilized, omitted, and/or combined as desired in a given application, without limitation.

DESCRIPTION OF EMBODIMENTS

Again, the present disclosure provides a light guide assembly that includes a light guide and a LED disposed at either end of the light guide, for example. The light guide includes two sections, one section that has an optical geometry or properties such that it is illuminated by activation of one of the LEDs and another section that has an optical geometry or properties such that it is illuminated by activation of the other of the LEDs. In this manner, selective activation of the LEDs provides selective illumination of the different sections of the light guide. This concept may be extended beyond two sections and two LEDs, providing the light guide assembly with multiple addressable "pixels," as light guides and LEDs may be stacked or disposed in adjacency to provide cumulative illumination effects. In this manner, more complex animations can be provided by the light guide assembly as compared to conventional light guides with simple on/off or fade in/out LEDs.

Figure 1:
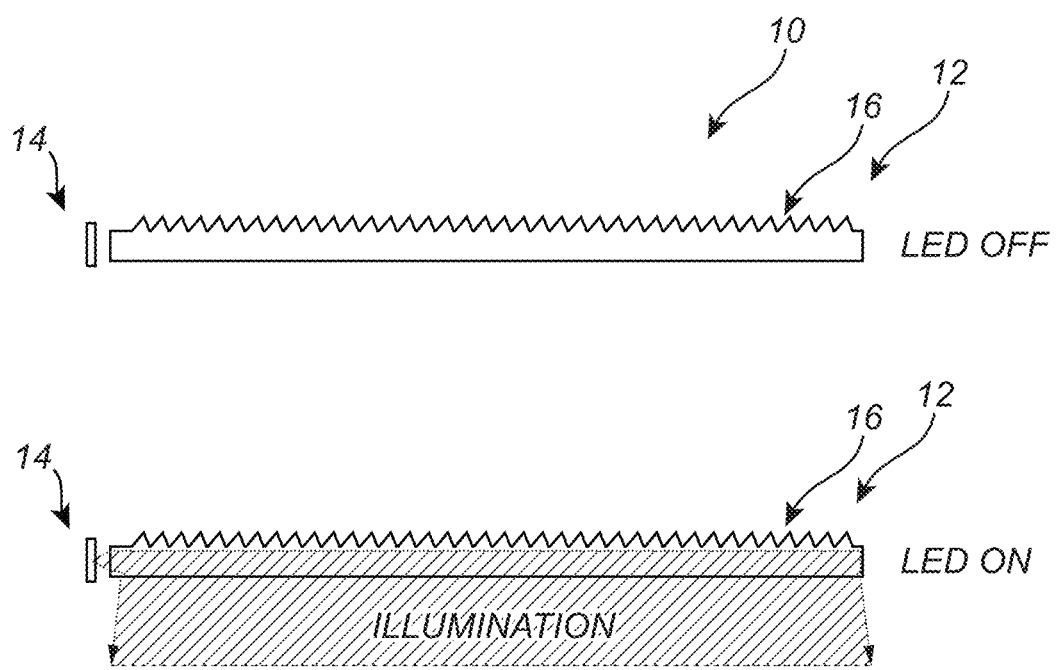
FIG. 1 is schematic diagram illustrating a conventional light guide assembly.

Referring now specifically to FIG. 1, a conventional light guide assembly 10 includes a light guide 12 that is selectively illuminated by a LED 14 that is optically coupled to the light guide 12, such as at an end of an elongated light guide. The LED 14 typically has on/off and/or fade in/out functionality. The light guide 12 may be a simple optical light tube or waveguide, well known to those of ordinary skill in the art, and may include internal or surface geometric optical features 16 designed to transmit visible light from the LED 14 to the eye of an observer external to the light guide 12. As is illustrated, when the LED 14 is activated/deactivated, the light guide 12 is thus illuminated/not illuminated, with fade in/out functionality also being possible.

Figure 2:
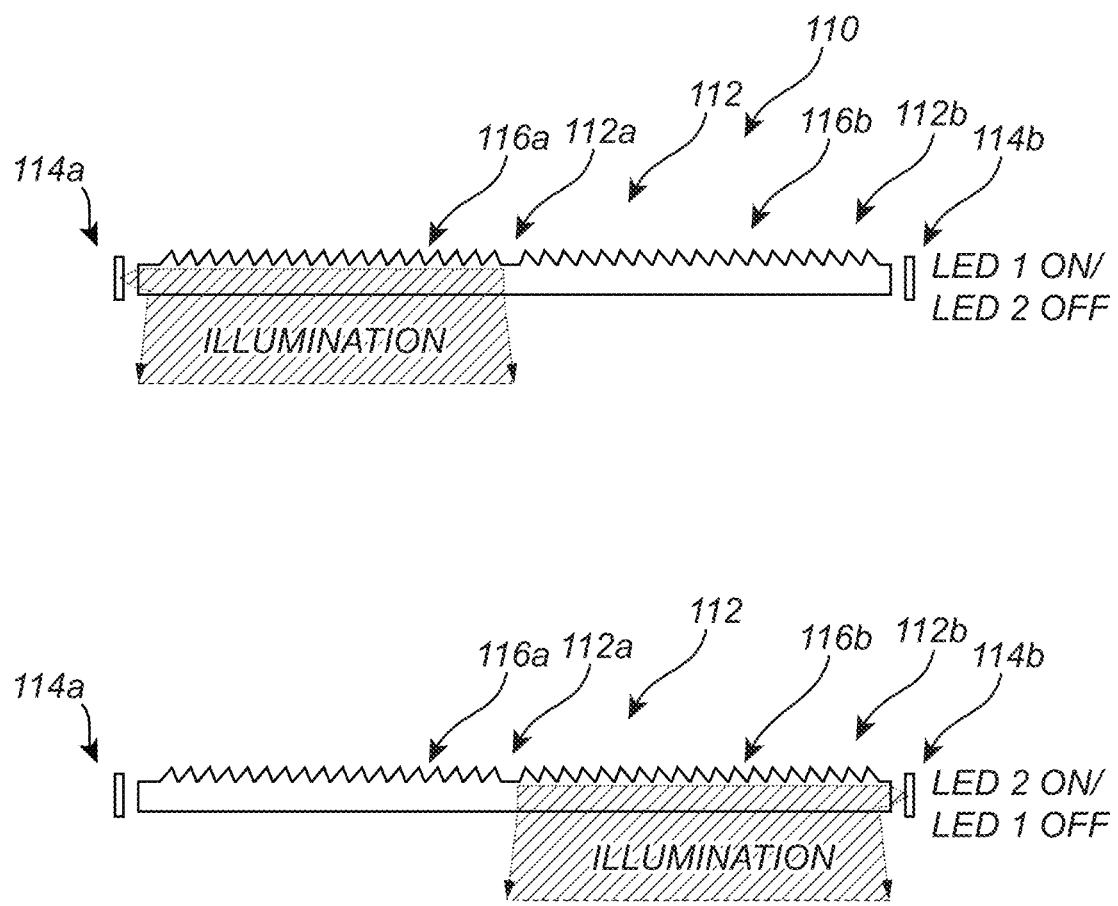
FIG. 2 is a schematic diagram illustrating one embodiment of the light guide assembly of the present disclosure.

Referring now specifically to FIG. 2, the light guide assembly 110 of the present disclosure includes a light guide 112 including a first section 112a that is selectively illuminated by a first LED 114a (or, more broadly, a first light source 114a) that is optically coupled to the light guide 112, such as at an end of an elongated light guide, and a second section 112b that is selectively illuminated by a second LED 114b (or, more broadly, a second light source 114b) that is also optically coupled to the light guide 112, such as at another end of the elongated light guide. Each LED 114a, 114b again has on/off and/or fade in/out functionality. Here, the light guide 112 may be a simple optical light tube or waveguide, well known to those of ordinary skill in the art, and includes internal or surface geometric or bulk optical features 116a, 116b designed to transmit visible light from the LEDs 114a, 114b to the eye of an observer external to the light guide 112. These features 116a, 116b differ from the first section 112a to the second section 112b such that the first LED 114a when actuated illuminates only the first section 112a and not the second section 112b and the second LED 114b when actuated illuminates only the second section 112b and not the first section 112a due to the directional variation in the light from the first LED 114a and the second LED 114b. Thus, as is illustrated, when the first LED 114a is activated/deactivated, the first section 112a of the light guide 112 is thus illuminated/not illuminated, with fade in/out functionality also being possible, while the second section 112b of the light guide 112 is not illuminated by the first LED 114a. Likewise, when the second LED 114b is activated/deactivated, the second section 112b of the light guide 112 is thus illuminated/not illuminated, with fade in/out functionality also being possible, while the first section 112a of the light guide 112 is not illuminated by the second LED 114b. This is due to the different directional selection of light between the first section optical features 116a and the second section optical features 116b of the light guide 112 along its length.

In this manner, selective activation of the LEDs 114a, 114b provides selective illumination of the different sections 112a, 112b of the light guide 112. As mentioned above, This concept may be extended beyond two sections and two LEDs, providing the light guide assembly with multiple addressable "pixels," as light guides and LEDs may be stacked or disposed in adjacency to provide cumulative illumination effects. In this manner, more complex animations can be provided by the light guide assembly as compared to conventional light guides with simple on/off or fade in/out LEDs. This is illustrated and described below.

Figure 3:
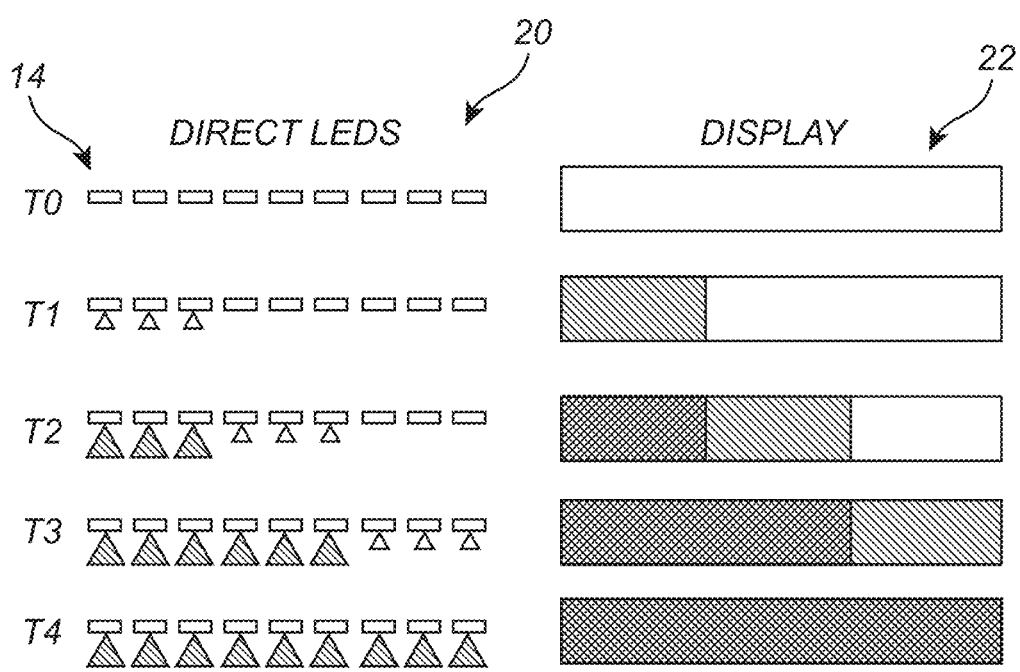
FIG. 3 is a schematic diagram illustrating a conventional multi-LED light assembly.

FIG. 3 is a schematic diagram illustrating a conventional multi-LED light assembly 20. As illustrated, "pixels" can be formed by an array of LEDs 14 that are selectively illuminated. Parallel rows, T0-T4, can then be used to saturate the intensity of illumination of each "pixel" as displayed. This provides a desired degree of display flexibility, but obviously requires many LEDs 14, with one or more LEDs 14 associated with each individual "pixel."

Figure 4:
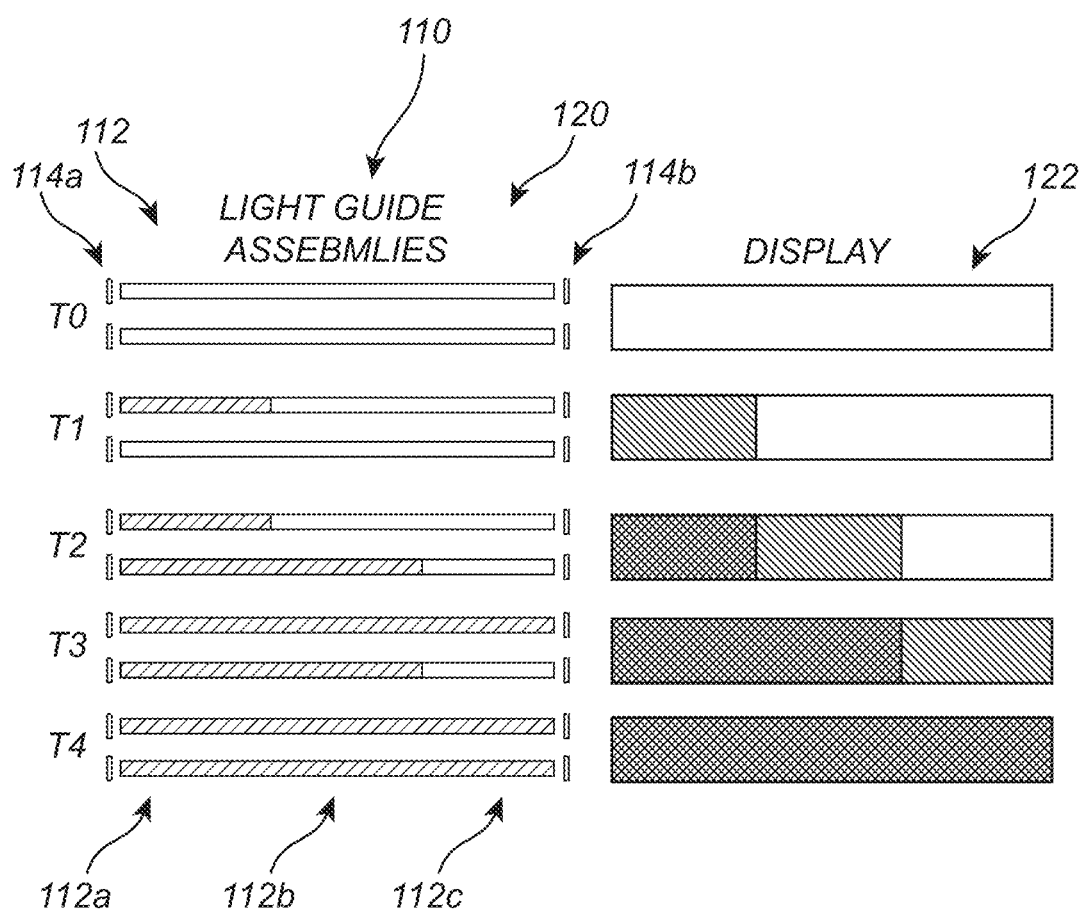
FIG. 4 is a schematic diagram illustrating one embodiment of the multi-light guide assembly of the present disclosure.

Referring now specifically to FIG. 4, similar or superior display flexibility may be achieved with the multi-light guide assembly 120 of the present disclosure, using far fewer LEDs 114a, 114b (or, more broadly, light sources 114a, 114b). As illustrated, "pixels" can be formed by parallel light guide assemblies 110, T0-T4, various sections 112a, 112b, 112c of which are selectively illuminated via the associated LEDs 114a, 114b coupled to the ends of the light guides 112 to saturate the intensity of illumination of each "pixel" as displayed. This provides the desired degree of display flexibility, using far fewer LEDs 114a, 114b. It should be noted that, in this embodiment, each light guides 112 is optically coupled to dedicated LEDs 114a, 114b, such that a complete system may include two light guides 112 and four LEDs 114a, 114b.

Thus, the light guide assembly 110 of the present disclosure provides more than just simple fade in/out animations, while preserving the benefits of light guides and LEDs—lower power consumption and cost. This solution is scalable, meaning that adding additional light guides and LEDs adds additional sections or "pixels" (e.g., 1 light guide=2 segments, 2 light guides=3 segments, etc.). It should be noted that the direction-sensitive light-extracting sections 112a, 112b,112c of the light guide 112 may be implemented via the manipulation of the bulk optical properties of the associated optical waveguide for each section 112a, 112b, 112c or by providing appropriate optical waveguide geometrical features, i.e., prism features, for example, for each section 112a, 112b, 112c.

Figure 5:
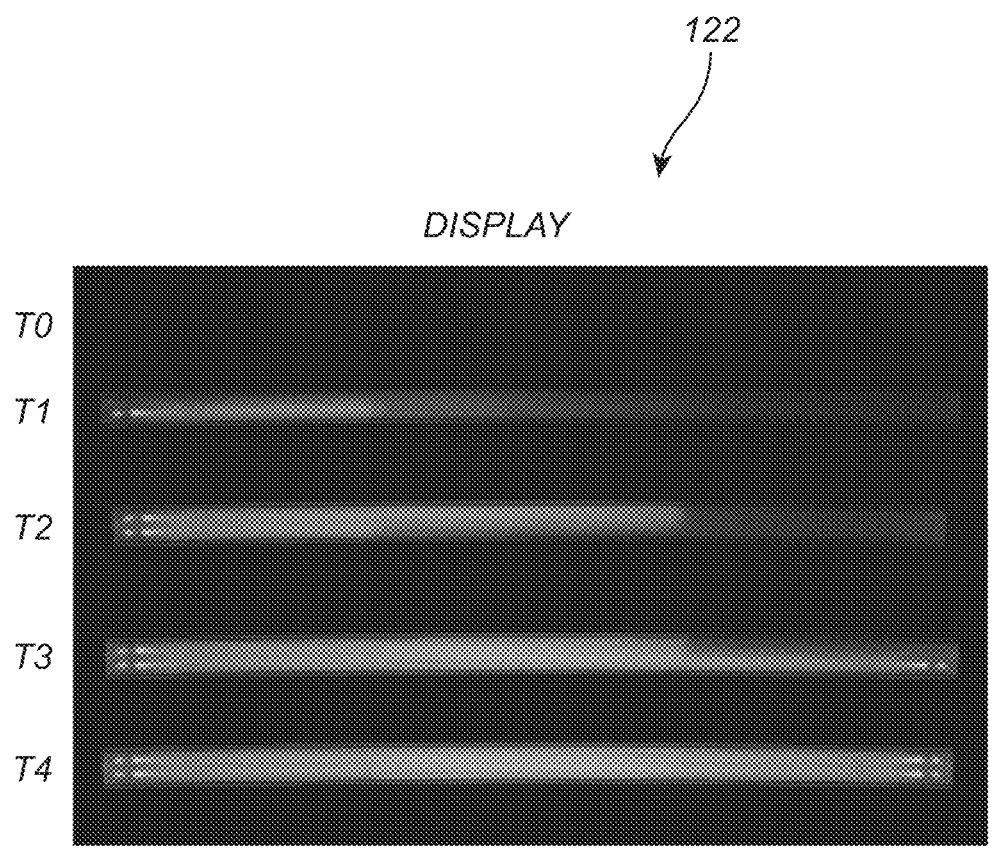
FIG. 5 is a simulation of the operation of the multi-light guide assembly of the present disclosure in an illustrative vehicle taillight application.

FIG. 5 is a simulation of the display 122 highlighting the operation of the multi-light guide assembly 120 of the present disclosure in an illustrative vehicle taillight application, for example.

Figure 6:
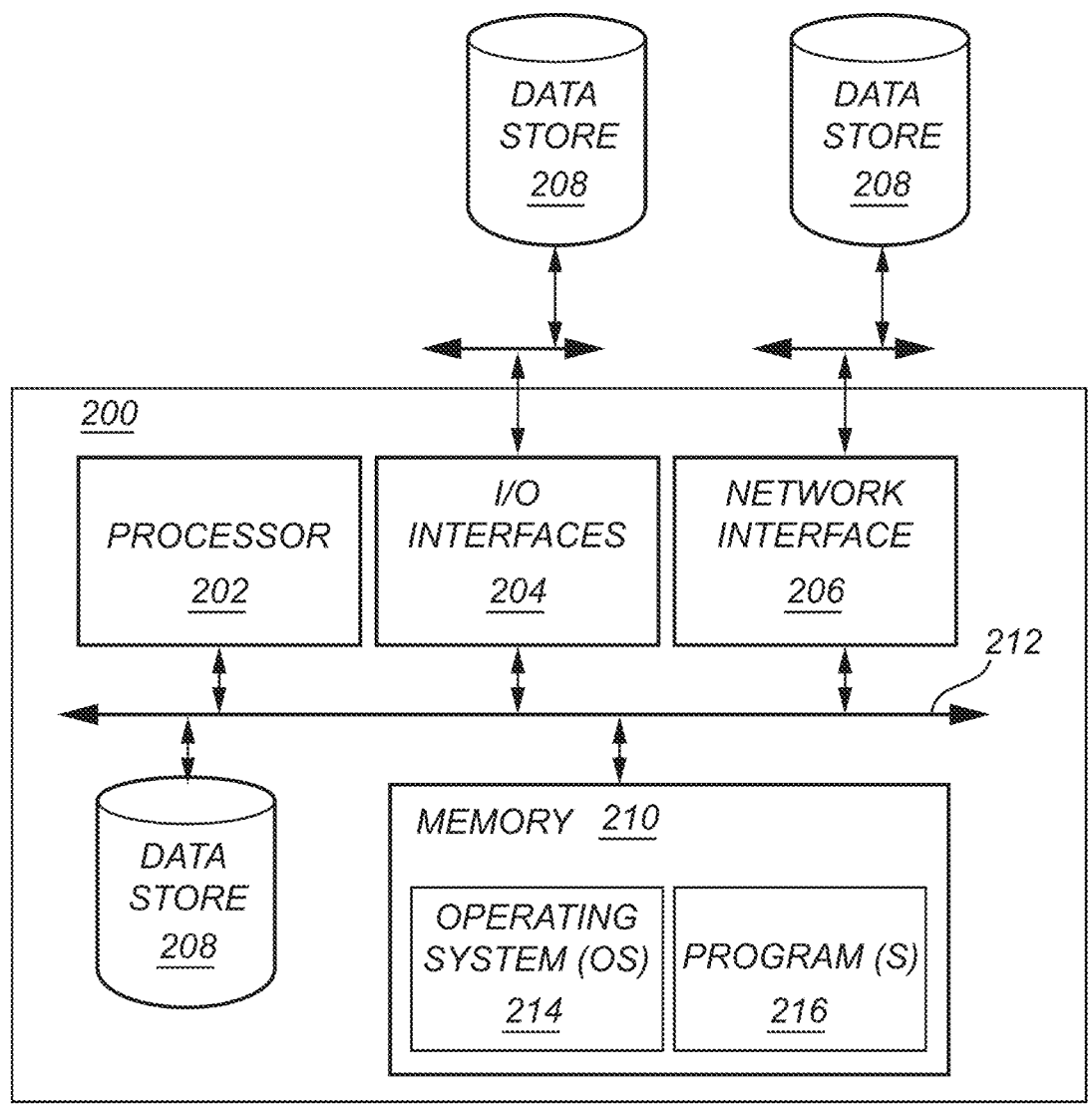
FIG. 6 is a block diagram of a server or processing unit that may be used to control the operation of the LEDs of the light guide assembly of the present disclosure.

FIG. 6 is a block diagram of a server or processing unit 200 that may be used in a cloud-based system, a networked system, or stand-alone to control the LEDs of the light guide assembly of the present disclosure. The server or processing unit 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server or processing unit 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server or processing unit 200, a semiconductor-based microprocessor (in the form of a microchip or chipset), or generally any device for executing software instructions. When the server or processing unit 200 is in operation, the processor 202 is configured to execute software stored within the memory 210, to communicate data to and from the memory 210, and to generally control operations of the server or processing unit 200 pursuant to the software instructions. The I/O interfaces 204 may be used to receive user input from and/or for providing system output to one or more devices or components.

The network interface 206 may be used to enable the server or processing unit 200 to communicate on a network, such as the Internet. The network interface 206 may include, for example, an Ethernet card or adapter (e.g., 10BaseT, Fast Ethernet, Gigabit Ethernet, or 10GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server or processing unit 200, such as, for example, an internal hard drive connected to the local interface 212 in the server or processing unit 200. Additionally, in another embodiment, the data store 208 may be located external to the server or processing unit 200 such as, for example, an external hard drive connected to the I/O interfaces 204 (e.g., a SCSI or USB connection). In a further embodiment, the data store 208 may be connected to the server or processing unit 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 7:
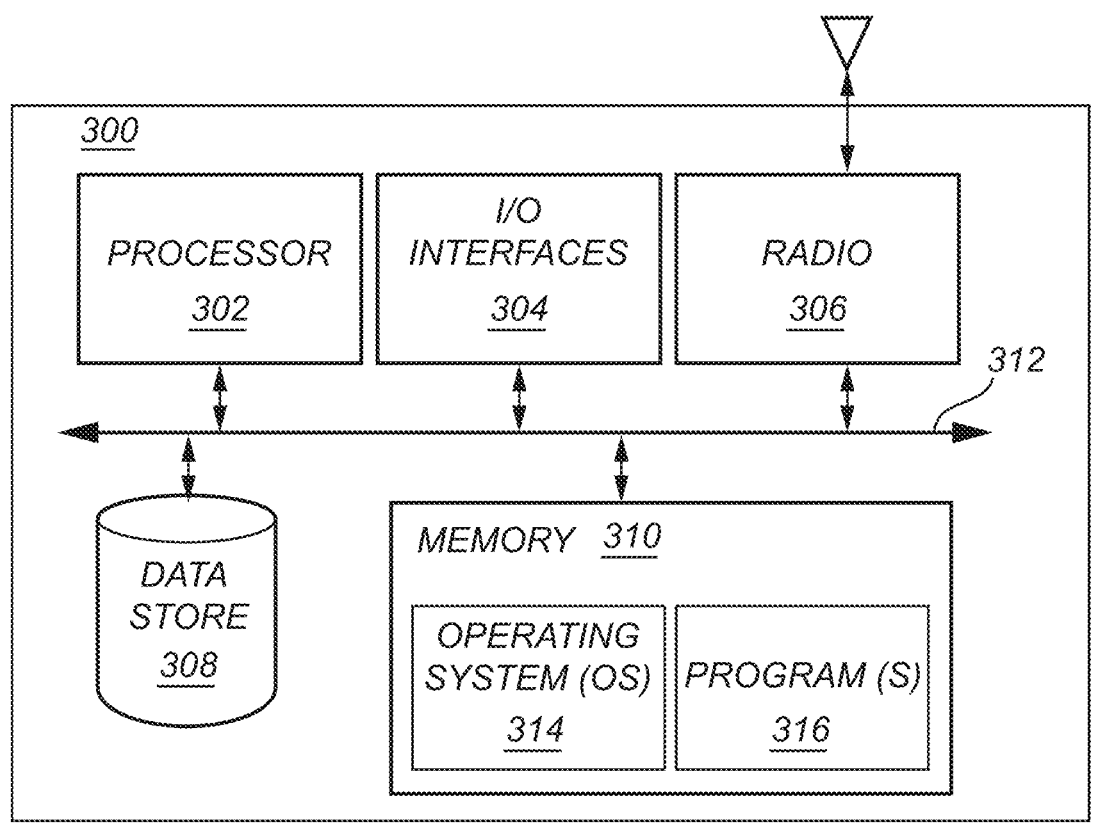
FIG. 7 is a block diagram of a device or system, such as a vehicle device or system, that may be used to control the operation of the LEDs of the light guide assembly of the present disclosure.

FIG. 7 is a block diagram of a device or system 300, such as a vehicle device or system, that may be used to control the operation of the LEDs of the light guide assembly of the present disclosure. The device or system 300 can be a digital device that, in terms of hardware architecture, generally includes a processor 302, I/O interfaces 304, a radio 306, a data store 308, and memory 310. It should be appreciated by those of ordinary skill in the art that FIG. 7 depicts the device or system 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but is not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the device or system 300, a semiconductor-based microprocessor (in the form of a microchip or chipset), or generally any device for executing software instructions. When the device or system 300 is in operation, the processor 302 is configured to execute software stored within the memory 310, to communicate data to and from the memory 310, and to generally control operations of the device or system 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and/or the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, the memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 7, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the device or system 300. In a typical example, the end-user typically uses one or more of the programs 316 along with a network such as a cloud-based system.

Although the present disclosure is illustrated and described with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A light guide assembly, comprising:
a plurality of light guides disposed in a parallel stacked configuration;
a first light source optically coupled to a first end of each of the plurality of light guides; and
a second light source optically coupled to a second end of each of the plurality of light guides opposite the first end of each of the plurality of light guides;
wherein each of the plurality of light guides comprises a first section adapted to receive light from both the corresponding first light source and the corresponding second light source and extract light from the corresponding first light source, but not the corresponding second light source, thereby illuminating the first section;
wherein each of the plurality of light guides comprises a second section adapted to receive light from both the corresponding first light source and the corresponding second light source and extract light from the corresponding second light source, but not the corresponding first light source, thereby illuminating the second section; and
wherein the first sections of the plurality of light guides are aligned to form a first pixel that is selectively illuminated by illumination of one or more of the first sections and the second sections of the plurality of light guides are aligned to form a second pixel that is selectively illuminated by illumination of one or more of the second sections.

2. The light guide assembly of claim 1, wherein the first light source comprises a first light emitting diode optically coupled to the first end of the light guide.

3. The light guide assembly of claim 1, wherein the second light source comprises a second light emitting diode optically coupled to the second end of the light guide.

4. The light guide assembly of claim 1, wherein the first section is adapted to directionally extract light from the first light source, but not the second light source.

5. The light guide assembly of claim 1, wherein the second section is adapted to directionally extract light from the second light source, but not the first light source.

6. The light guide assembly of claim 1, wherein each of the first section and the second section is manufactured with a bulk optical property or geometrical features to selectively extract light from only the first light source or the second light source.

7. The light guide assembly of claim 1, wherein the light guide assembly is utilized in one of an interior lighting system and an exterior lighting system of a vehicle providing a degree of lighting animation.

8. A multi-light guide assembly, comprising:
a plurality of light guides disposed in a parallel stacked configuration;
a first light source optically coupled to a first end of each of the plurality of light guides; and
a second light source optically coupled to a second end of each of the plurality of light guides opposite the first end of each of the plurality of light guides;
wherein each of the plurality of light guides comprises a first section adapted to receive light from both the corresponding first light source and the corresponding second light source and extract light from the corresponding first light source, but not the corresponding second light source, thereby illuminating the first section;
wherein each of the plurality of light guides comprises a second section adapted to receive light from both the corresponding first light source and the corresponding second light source and extract light from the corresponding second light source, but not the corresponding first light source, thereby illuminating the second section; and
wherein the first sections of the plurality of light guides are aligned to form a first pixel that is selectively illuminated by illumination of both of the first sections and the second sections of the plurality of light guides are aligned to form a second pixel that is selectively illuminated by illumination of both of the second sections.

9. The multi-light guide assembly of claim 8, wherein the first light source comprises a first light emitting diode optically coupled to the first end of the corresponding light guide.

10. The multi-light guide assembly of claim 8, wherein the second light source comprises a second light emitting diode optically coupled to the second end of the corresponding light guide.

11. The multi-light guide assembly of claim 8, wherein the first section is adapted to directionally extract light from the first light source, but not the second light source.

12. The multi-light guide assembly of claim 8, wherein the second section is adapted to directionally extract light from the second light source, but not the first light source.

13. The multi-light guide assembly of claim 8, wherein each of the first section and the second section is manufactured with a bulk optical property or geometrical features to selectively extract light from only the first light source or the second light source.

14. The multi-light guide assembly of claim 8, wherein the multi-light guide assembly is utilized in one of an interior lighting system and an exterior lighting system of a vehicle providing a degree of lighting animation.

15. A lighting method, comprising:
providing a light guide assembly, comprising:
a plurality of light guides disposed in a parallel stacked configuration;
a first light source optically coupled to a first end of each of the plurality of light guides; and
a second light source optically coupled to a second end of each of the plurality of light guides opposite the first end of each of the plurality of light guides;
wherein each of the plurality of light guides comprises a first section adapted to receive light from both the corresponding first light source and the corresponding second light source and extract light from the corresponding first light source, but not the corresponding second light source, thereby illuminating the first section;
wherein each of the plurality of light guides comprises a second section adapted to receive light from both the corresponding first light source and the corresponding second light source and extract light from the corresponding second light source, but not the corresponding first light source, thereby illuminating the second section, and
wherein the first sections of the plurality of light guides are aligned to form a first pixel that is selectively illuminated by illumination of one or more of the first sections and the second sections of the plurality of light guides are aligned to form a second pixel that is selectively illuminated by illumination of one or more of the second sections; and
selectively actuating one or more of the first light sources and the second light sources to selectively illuminate one or more of the first pixel and the second pixel.

16. The lighting method of claim 15, wherein the first light source comprises a first light emitting diode optically coupled to the first end of the light guide.

17. The lighting method of claim 15, wherein the second light source comprises a second light emitting diode optically coupled to the second end of the light guide.

18. The lighting method of claim 15, wherein the first section is adapted to directionally extract light from the first light source, but not the second light source.

19. The lighting method of claim 15, wherein the second section is adapted to directionally extract light from the second light source, but not the first light source.

20. The lighting method of claim 15, wherein each of the first section and the second section is manufactured with a bulk optical property or geometrical features to selectively extract light from only the first light source or the second light source.

* * * * *